(12) United States Patent
Zhou

(10) Patent No.: US 10,405,033 B2
(45) Date of Patent: *Sep. 3, 2019

(54) METHOD FOR CONTROLLING NETWORK MEDIA INFORMATION PUBLICATION, APPARATUS, AND SERVER

(71) Applicant: Tencent Technology (Shenzhen) Company Limited, Shenzhen, Guangdong (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,901

(22) Filed: Jun. 7, 2018

(65) Prior Publication Data

US 2018/0288476 A1    Oct. 4, 2018

Related U.S. Application Data

(63) Continuation of application No. 15/189,875, filed on Jun. 22, 2016, now Pat. No. 10,028,019, which is a (Continued)

(30) Foreign Application Priority Data

Apr. 22, 2014    (CN) .......................... 2014 1 0161517

(51) Int. Cl.
*H04N 21/44*        (2011.01)
*H04N 21/442*       (2011.01)
(Continued)

(52) U.S. Cl.
CPC . *H04N 21/44008* (2013.01); *H04N 21/23418* (2013.01); *H04N 21/4402* (2013.01);
(Continued)

(58) Field of Classification Search
CPC ....... H04N 21/23418; H04N 21/44008; H04N 21/4402; H04N 21/44209;
(Continued)

(56) References Cited

U.S. PATENT DOCUMENTS

2006/0068861 A1    3/2006    Triestram et al.
2016/0094886 A1    3/2016    Lian et al.

FOREIGN PATENT DOCUMENTS

CN        102868929 A      1/2013
CN        103702211 A      4/2014
CN        103703789 A      4/2014

OTHER PUBLICATIONS

Office Action and Summary to corresponding Chinese Application No. 201410161517.9, dated Aug. 2, 2018, pp. 1-8.

*Primary Examiner* — Nicholas T Corbo

(74) *Attorney, Agent, or Firm* — Brinks Gilson & Lione

(57) ABSTRACT

A method for controlling network media information publication, an apparatus and a server are provided. More than one piece of network media information may be pre-downloaded. When a video is played, a stagnation event of the video is detected. When a stagnation event occurs, a frame picture related to the stagnation event is read. A degree of similarity between the frame picture and each piece of network media information is calculated. A piece of network media information having a highest degree of similarity with the frame picture is selected; and the network media information is displayed on a current playing interface. In this way, a click-through rate and a transformation rate of network media information, and the amount of attention on given to network media information when a network bandwidth condition is not good can be increased.

20 Claims, 7 Drawing Sheets

Related U.S. Application Data continuation of application No. PCT/CN2015/076845, filed on Apr. 17, 2015.

(51) Int. Cl.
    *H04N 21/6377*    (2011.01)
    *H04N 21/643*     (2011.01)
    *H04N 21/234*     (2011.01)
    *H04N 21/4402*    (2011.01)
    *H04N 21/472*     (2011.01)

(52) U.S. Cl.
    CPC . *H04N 21/44209* (2013.01); *H04N 21/44222* (2013.01); *H04N 21/472* (2013.01); *H04N 21/6377* (2013.01); *H04N 21/64322* (2013.01)

(58) Field of Classification Search
    CPC ........... H04N 21/44222; H04N 21/472; H04N 21/6377; H04N 21/64322
    See application file for complete search history.

| 1 | 2 | 3 |
|---|---|---|
| 4 | 5 | 6 |
| 7 | 8 | 9 |

Frame picture

| 1 | 2 | 3 |
|---|---|---|
| 4 | 5 | 6 |
| 7 | 8 | 9 |

Network media information picture

FIG. 3

METHOD FOR CONTROLLING NETWORK MEDIA INFORMATION PUBLICATION, APPARATUS, AND SERVER

CROSS-REFERENCE TO RELATED APPLICATIONS

This application is a continuation application of U.S. patent application Ser. No. 15/189,875, filed on Jun. 22, 2016, which is a continuation of International Application No. PCT/CN2015/076845, filed on Apr. 17, 2015, which claims priority to Chinese Patent Application No. 201410161517.9, filed on Apr. 22, 2014, all of which are hereby incorporated by reference in their entirety.

FIELD OF THE TECHNOLOGY

The present disclosure relates to Internet data processing technologies, and in particular, to a method for controlling network media information publication and a related apparatus and server.

BACKGROUND OF THE DISCLOSURE

Network media information includes various types of information. It may have digital code as a carrier and may be published on various display forms (such as a webpage and a client interface) of an Internet system. Generally, network media information corresponds to a target webpage. When a user clicks on network media information, the user may go to a corresponding target webpage and content of the target webpage may be shown to the user. How to publish and display network media information to a specific audience effectively and to manage displayed information effectively is a current concern of an Internet technology industry.

Network media information processing and displaying technologies have been developing rapidly in recent years, and have been applied to many industry fields. For example, in the field of Internet advertisement processing and displaying, an Internet advertisement is a type of network media information. One of the network media information processing and displaying technologies is a network media information publication control technology.

Network media information publishers are highly concerned about the use of network media information processing and displaying technologies to increase a click-through rate and a transformation rate of network media information.

The click-through rate is a ratio of the number of times that content on a webpage is clicked to the number of times that the content is displayed, and is expressed as a percentage. The click-through rate reflects the amount of attention paid to content on a webpage, and is usually used to measure attractiveness of network media information.

The transformation rate is a ratio of the number of times that transformation behaviors are performed to the number of times that displayed network media information is clicked on within a statistics period. The transformation behavior is completion, by an audience visiting a website, of a task specified by an information publisher on the website. For example, the following listed behaviors may be transformation behaviors.

1. Stay on a website for a certain period of time.
2. View a specific page such as a registration page or a "contact us" page on a website.
3. Register on a website or submit an order.
4. Consult by leaving a message on a website or by using an online instant messaging tool on a website.
5. Make an actual payment or close a deal (especially on an electronic commerce website).

SUMMARY

In view of the above, exemplary embodiments of the present disclosure provide a method for controlling network media information publication and a related apparatus, server, and system. Embodiments of the present disclosure may increase click-through rate and transformation rate of network media information and increase the amount of attention on network media information when a network bandwidth condition is not good. Furthermore, waste may be reduced in use of machine resources and network resources, which may otherwise be caused by blind publishing volume expansion by a publisher.

A method is provided for controlling network media information publication. A terminal may send a video play request to a server and may receive a video that the terminal requests to play. The video may be determined from more than one piece of network media information matching the video play request. The terminal may download the more than one piece of network media information and store the more than one piece of network media information. The terminal may play the video and perform detection for a stagnation event of the video when the video is played. The terminal may read a frame picture related to the stagnation event when a stagnation event occurs. A degree of similarity between the frame picture and each piece of network media information may be calculated by the terminal. A piece of network media information having a highest degree of similarity with the frame picture may be selected and displayed on a current playing interface of the video.

A video playing apparatus may include one or more processors, a memory and one or more program modules stored in the memory and executed by the one or more processors. The one or more program modules may include a pre-downloading terminal module that may be configured to send a video play request to a server, download more than one piece of network media information matching the video play request, and store the more than one piece of network media information. A playing terminal module may be configured to play a video of which playing is requested. A detecting module may be configured to perform detection for a stagnation event of the video and send stagnation event information when a stagnation event occurs. A network media information displaying module may be configured to receive a network media information identifier returned by the server, read network media information corresponding to the network media information identifier from the stored network media information, and display the network media information on a current playing interface.

A server may include one or more processors, a memory and one or more program modules that may be stored in the memory and executed by the one or more processors. The one or more program modules may include a pre-downloading service module that may be configured to receive a video play request, return more than one piece of network media information to a requester, and return data of a video of which playing is requested. A frame picture obtaining module may be configured to receive stagnation event information of the requester, and read, according to the stagnation event information, a frame picture related to a stagnation event. A similarity degree calculating module may be configured to calculate a degree of similarity between the frame picture and each piece of network media information. A network media information publishing module may be configured to select a piece of network media information having a highest degree of similarity with the frame picture, and return an identifier of the network media information to the requester.

According to the present disclosure, pre-downloaded network media information may be displayed on a playing interface when a video stagnates, and the network media information is network media information having a highest degree of similarity with a frame picture that is already seen by a user. Therefore, relevance to content played on a video interface can be increased, and the amount of attention of users on the network media information is increased, which further increases a click-through rate and a transformation rate of the network media information. Once the click-through rate and the transformation rate are increased, a probability of blind publishing volume expansion by a publisher is reduced, so as to further reduce waste of machine resources and network resources caused by blind publishing volume expansion by the publisher.

BRIEF DESCRIPTION OF THE DRAWINGS

The aforementioned features and advantages of the disclosed embodiments as well as additional features and advantages thereof will be more clearly understood hereinafter as a result of a detailed description of preferred embodiments when taken in conjunction with the drawings.

The following briefly describes the accompanying drawings included for describing the embodiments or the prior art. The accompanying drawings in the following descriptions merely show some embodiments, and persons of ordinary skill in the art can derive other drawings from these accompanying drawings without creative efforts.

FIG. 3 is a schematic diagram of dividing two compared pictures into a same quantity of comparing units by using a same dividing method.

DESCRIPTION OF EMBODIMENTS

In an existing system for controlling network media information publication, there is a technical solution of playing network media information before a network video. In this technical solution, within a period of time before a video is played, which normally is 15 seconds, 30 seconds, 60 seconds or even longer, a piece of network media information is loaded and played.

However, a current inquiry of an Internet inquiry community about acceptance of a time length of network media information played before a video shows that network users have a low acceptance of network media information played before a network video. With regard to a form of network media information played before a video, a ratio of users who totally cannot accept the network media information obviously rises with the decrease of a time length of a video; and particularly when users watch a short video that lasts less than 5 minutes, nearly 40 percent of users cannot put up with playing of network media information before the video.

Figure 1:
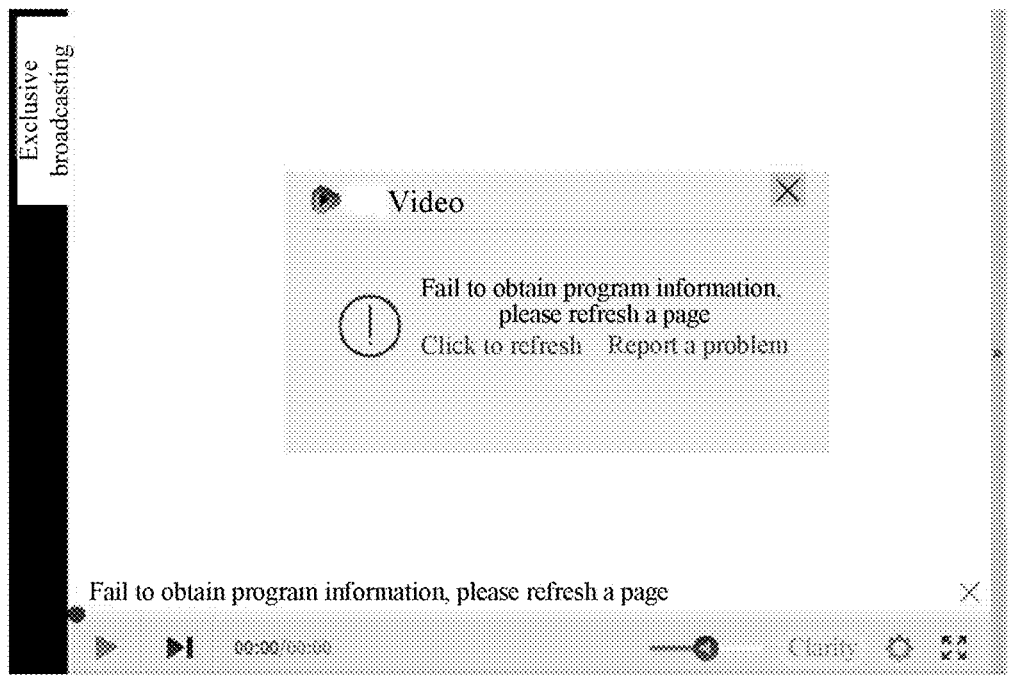
FIG. 1 is an illustration of a video interface when a network bandwidth condition is not good.

Particularly when a network bandwidth condition is not good, a video stagnation event occurs as shown in a diagram of a video interface when a network bandwidth condition is not good in FIG. 1. In that case, because a video is loaded slowly, and network media information is played before the video, a waiting time of a user is greatly increased. Therefore, the user would often give up watching the video at last, which eventually reduces the amount of attention of users on a video website and greatly reduces an actual click-through rate and a transformation rate of the network media information. Meanwhile, because the amount of attention of the users is reduced, in order to publish network media information enough to cover a specific target audience, a publisher increases a publishing volume of the network media information blindly, which leads to redundancy and waste during network media information publication, and too much machine resources (such as storing resources and calculating resources) and network resources (such as bandwidth resources and network device resources) are occupied.

The following describes the present disclosure in further detail with reference to the accompanying drawings and specific embodiments.

Figure 2:
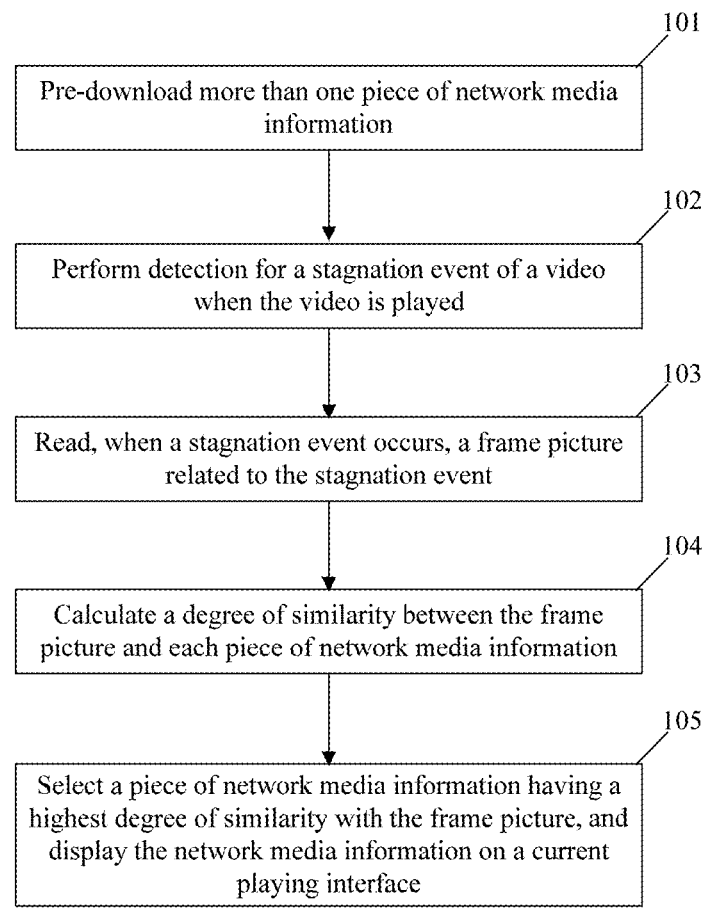
FIG. 2 is an operating flowchart of a method for controlling network media information publication according to an embodiment of the present disclosure.

FIG. 2 is an operating flowchart of a method for controlling network media information publication according to an embodiment of the present disclosure. This method needs to be executed by a playing terminal and a server (also known as a cloud) at a network side.

The playing terminal is a terminal having a video playing function and interacting with a user, and may be implemented by using a dedicated video playing client, or may be implemented in a manner of a network browser visiting a video server, that is, a browser/server (B/S) structure may be adopted, and a client/server (C/S) structure may also be adopted. However, in an age when network information develops rapidly, a system structure may develop and change; however, no matter what a structure is, a core idea and core functional modules of the present disclosure are the same, and only positions at which modules executing functions are located are different. A person skilled in the art can flexibly choose a structure, which is not limited in the present disclosure.

Referring to FIG. 2, the method includes:

Step 201: Pre-download more than one piece of network media information.

In this step, a playing terminal first needs to send a video play request to a server at a network side, so as to request playing of a video. The video play request is a playing instruction that is sent by the terminal and used for playing the video; for example, the playing instruction is sent to a corresponding server when a user opens a network video address by using a browser or a player on the terminal. The video play request at least includes the address of the video of which playing is requested or a video identifier. After receiving the video play request, the server first determines more than one piece of network media information matching the video play request, caches the more than one piece of network media information on the server, and returns the more than one piece of network media information to the playing terminal that initiates the video play request; the terminal downloads the more than one piece of network media information, and stores the more than one piece of network media information at the playing terminal locally; afterwards, the server obtains data of the video according to the address of the video or the video identifier, and returns the data of the video to the playing terminal for video playing. Because the video is played online, the data of the video is returned to the playing terminal in a form of a succession of video frames.

The more than one piece of downloaded network media information in this embodiment may be a picture, where information such as a network link can be embedded in the picture, and the network media information may also be video information and the like; when a degree of similarity between a frame picture and each piece of network media information is calculated subsequently, the network media information needs to be compared in a form of a picture; and if the network media information is video information, a specified frame picture (which usually is the first frame picture) of the video needs to be used as a representative picture of the network media information, so as to compare the picture with the frame picture and calculate the similarity degree.

The following explains the technical solutions of the present disclosure by using network media information in a form of a picture as an example, that is, in the following embodiment, the network media information is a network media information picture.

In a preferred embodiment, the pre-downloading one or more network media information pictures includes the following steps 211 to 213:

Step 211: A server obtains dimensional information of a video play request, where the dimensional information at least includes a program category feature of a video to be played.

The dimensional information of the video play request is a feature of a terminal that sends the video play request and a feature of the video, such as a current time period, a place at which the terminal is located, age and gender of a current user, or other information, and further includes a program category feature of the played video. The program category feature is a feature parameter of content of a program of each video, which indicates, for example, whether the program belongs to an entertainment type, a sports type, a life type, a teenager type, a children type, or another type. After the video is stored in the server, the program category feature of the video may be set by an administrator and stored in a specified position. When sending the video play request, the terminal searches for the program category feature of the video according to an identifier of the video. Information such as the place at which the terminal is located and the age and gender of the current user may also be obtained from an existing related information system.

Step 212: Match the dimensional information against a directional dimension of a network media information picture submitted by a publisher, so as to acquire a matching network media information picture.

When a publisher of network media information submits a publishing request (which is also called an order) to a publishing system, the publishing request needs to include a network media information picture to be published and a directional dimension, and the directional dimension may be information such as audience gender, audience age, an audience region, displaying time, a displaying scenario, displayed content, displaying frequency, displayed innovative information, and a video program category feature. When a user sends a displaying request (such as a request for displaying a webpage, a video, or a client), a network media information publication and displaying system obtains dimensional information of the sent displaying request, such as a time period, a place, age and gender of the user, and a video program category feature, and then matches the dimensional information against a directional dimension of a network media information picture submitted by a publisher, so as to acquire a matching network media information picture.

Step 213: Download the matching network media information picture to the playing terminal.

In an embodiment, if there are a lot of matching network media information pictures, for example, the number of matching network media information pictures is greater than a threshold M, the network media information pictures are sorted according to matching degrees of similarity between the network media information pictures and the dimensional information, and the first M network media information pictures are downloaded to the terminal.

Step 202: Perform detection for a stagnation event of a video when the video is played.

In this step, after receiving video frames returned by the server, the playing terminal may play a video, and perform detection for a stagnation event of the video during a process of playing the video. The performing detection for a stagnation event of the video includes: performing detection for a loading pause event of the video, and performing detection for a frame miss event of the video.

Step 203: Read, when a stagnation event occurs, a frame picture related to the stagnation event.

In this step, when a loading pause event of the video is detected, a frame picture of a current pausing interface of the video may be read; and when a frame miss event of the video is detected, the last frame picture that is already played may be read.

Specifically, after detecting the stagnation event, the playing terminal reports stagnation event information to the server.

In an embodiment, the stagnation event information may only be a flag bit. For example, in the case of network bandwidth sufficiency, the playing terminal returns a flag bit, for example, a, which includes a normal value to the server in real time, and it is assumed that the normal value is 0. When a stagnation event of the video occurs due to network bandwidth insufficiency, the playing terminal returns a flag bit a including an abnormal value to the server, and in this case, a=1. Once the server receives the flag bit, where a=1, the server reads a latest frame picture that is sent before the flag bit is received, and calculates a degree of similarity between the frame picture and the downloaded network media information picture.

In another embodiment, when detecting a loading pause event of the video, the playing terminal may further add a frame picture or a frame number of a current pausing interface to sent stagnation event information; and when detecting a frame miss event of the video, the playing terminal may further add a frame number of a missed frame to the sent stagnation event information. After receiving the frame picture or the frame number, the server obtains a corresponding frame picture according to the frame number.

Step 204: Calculate a degree of similarity between the frame picture and each network media information picture.

In this step, calculation can be performed by the server; because in step 201, the server already caches the more than one network media information pictures to be downloaded by the playing terminal, the server may match the frame picture against each network media information picture, so as to calculate a similarity degree. A calculation method of step 204 includes the following steps 241 to 244.

Step 241: Adjust a size of the frame picture and a size of each network media information picture to a same size.

Step 242: Divide the frame picture and each network media information picture into a same quantity of comparing units having same positions.

In an embodiment, the comparing unit may be an image point, namely a smallest unit of a picture. Because the size of the frame picture and the size of the network media information picture are the same, a quantity of image points of the frame picture and a quantity of image points of the network media information picture are also the same; assuming coordinates of an image point n on the frame picture is (x, y), there is a corresponding image point at a same position n' (x, y) on the network media information picture.

In another embodiment, the comparing unit may be an image block, that is, a picture may be divided into several areas, where each area constitutes an image block; and a quantity and positions of image blocks on the frame picture are the same as a quantity and positions of image blocks on each network media information picture. FIG. 3 is a schematic diagram of dividing two compared pictures into a same quantity of comparing units by using a same dividing method. Referring to FIG. 3, dividing of a frame picture is shown on a left side, and dividing of network media information is shown on a right side; the frame picture and the network media information are each divided into image blocks (namely comparing units) numbered 1 to 9; when calculation is performed subsequently through comparison, each two image blocks having a same number are compared, that is, the two image blocks having the same number are considered as comparing units that have same positions or are located at same positions.

Step 243: Calculate a feature value of each comparing unit of the frame picture and a feature value of each comparing unit of each network media information picture.

In this step, the calculation method includes: calculating the feature value of each comparing unit of the frame picture separately, and calculating the feature value of each comparing unit of each network media information picture separately. Following steps are performed for each comparing unit.

Firstly, at least one image element value of the comparing unit is obtained.

The at least one image element value at least includes: a color value, a resolution value, a lightness value, a pixel value, and a specified material value.

Afterwards, cluster analysis is performed on the at least one image element value by adopting a cluster analysis method, and an acquired value is used as a feature value of the comparing unit.

In an embodiment, the cluster analysis method is a method combining common hashing with local sensitive hashing (LSH).

LSH can implement quick clustering of element values. Because hashing is a typical Key-Value structure, a design idea thereof is to transfer any key word in a Key set to Value space as evenly as possible. Different Keys correspond to different Values, and even a slight change of a Key value can cause a great change of a Value value. LSH is a Hash manner that can make Value values calculated by using similar Key values same or similar under a certain metric; such same or similar files can be retrieved quickly in the Hash manner, so as to be used for quick similarity comparison. In another embodiment, cluster analysis is performed by adopting SimHash of LSH in the present disclosure. SimHash is a highly effective dimension reduction technology of LSH, which can map a high dimension vector into a finger print having a few digits and can keep a Cosine distance relation of an original feature; and SimHash is well applied to aspects such as webpage duplication checking currently.

The specified material value is used when the comparing unit is an image block. The specified material value is a value corresponding to a material that frequently appears historically. For example, special constructions such as Tian An Men and Bird's Nest Stadium have a rather standardized image, and a predetermined material value can be specified for these standardized materials. For example, a material value corresponding to Tian An Men is 011000, and a material value corresponding to Bird's Nest Stadium is 111000. These specified material values are stored in a corresponding database, and corresponding names of the specified material values are stored. In this way, in the present disclosure, a profile of the image block may be recognized by using an existing image recognition method, a name thereof is determined, and a corresponding material value is read from a corresponding database according to the name, thereby reducing calculations.

In another preferred embodiment, a feature value of each comparing unit of each network media information picture may be calculated offline in advance and stored in a specified database. When the degree of similarity between the frame picture and each network media information picture is calculated, only the feature value of each comparing unit of the frame picture needs to be calculated, and the feature value of each comparing unit of each network media information picture can be read directly from the specified database, which further improves processing efficiency and a processing speed.

Step 244: comparing the feature value of each comparing unit of the frame picture with a feature value of a comparing unit having a same position as the comparing unit of the frame picture on the network media information picture, and calculating a degree of similarity between the feature values; and adding degrees of similarity between feature values of all comparing units of the frame picture and feature values of all comparing units of the network media information picture together, so that an acquired total similarity degree is a degree of similarity between the frame picture and the network media information picture.

The following further describe the foregoing step 204 by using an embodiment in which the comparing unit is an image point as an example. The following steps are performed for the frame picture and a network media information picture.

(1) Establish coordinate axes of the frame picture and the network media information picture, and obtain an image element value of each coordinate point of the two pictures, including a color value, a resolution value, a lightness value, a pixel value, and the like.

(2) Perform cluster analysis on the element value of each coordinate point by adopting a cluster analysis method, and use an acquired value as a feature value of the coordinate point.

(3) Compare a feature value of each coordinate point (xi, yi) of the frame picture and a feature of a coordinate point (xi, yi) having a same position as the coordinate point (xi, yi) of the frame picture on the network media information picture, and calculate a degree of similarity between the feature values, so as to acquire a degree of similarity between each two coordinate points having same positions on the two pictures. For a similarity degree calculating method, reference may be made to an existing similarity degree calculating method, which is not described herein.

(4) Add degrees of similarity between all coordinate points of the two pictures together, so as to acquire a degree of similarity between the two pictures.

Step 205: Select a network media information picture having a highest degree of similarity with the frame picture, and display the network media information picture on a current playing interface.

In this step, the server may return an identifier of the selected network media information picture having the highest degree of similarity with the frame picture to the playing terminal; and the playing terminal reads the network media information picture locally according to the identifier of the network media information picture, and displays the network media information picture on the current playing interface.

Figure 4:
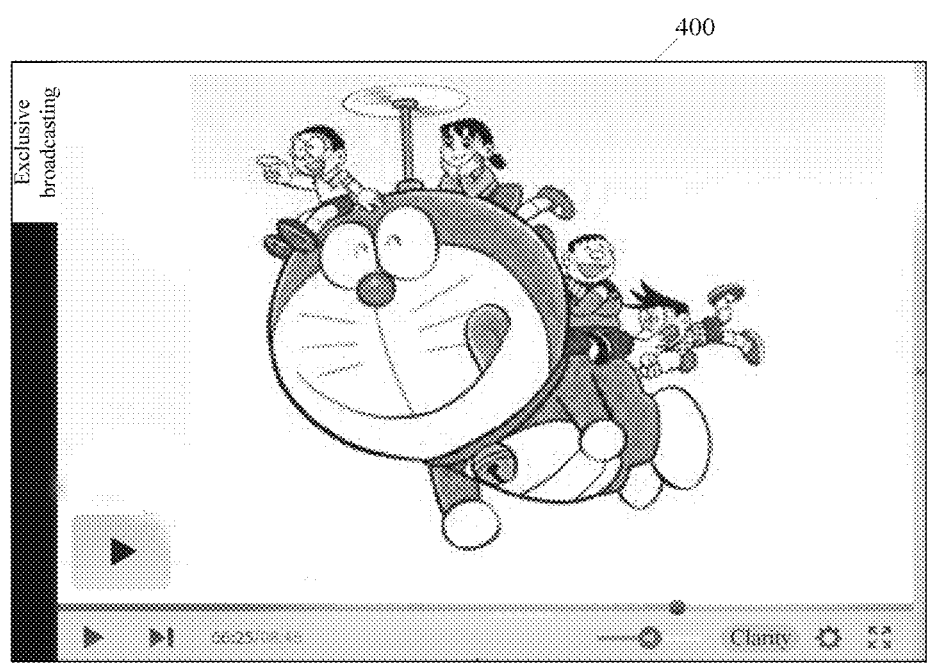
FIG. 4 is a schematic diagram of a picture loading pause resulted from a stagnation event that occurs when a video is played.
Figure 5:
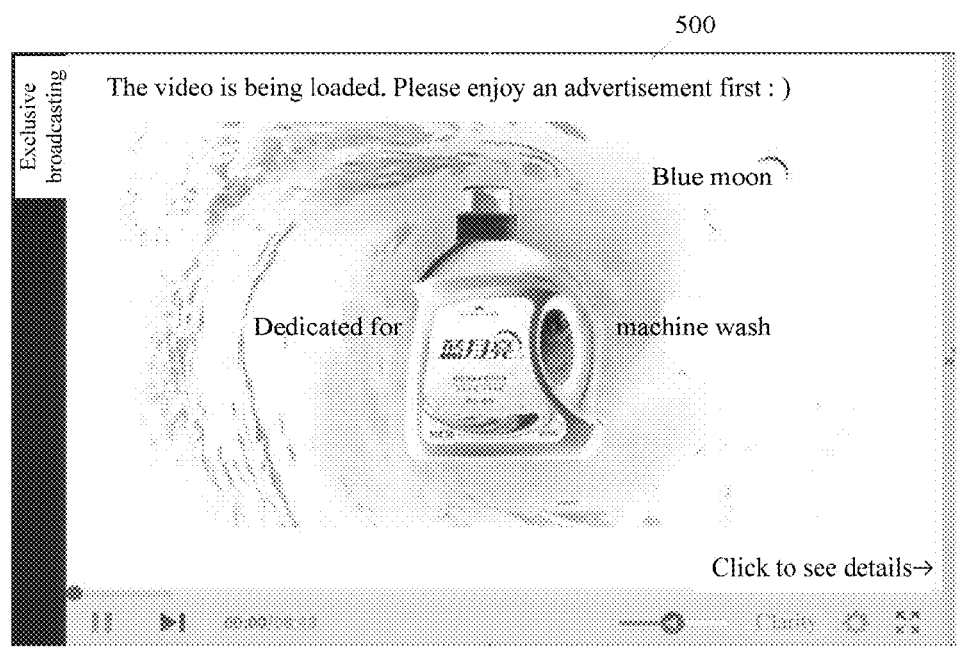
FIG. 5 is a schematic diagram of a network media information picture of which a feature is most similar to a feature of a pausing picture according to an embodiment of the present disclosure.

FIG. 4 is a schematic diagram of a picture loading pause resulted from a stagnation event that occurs when a video is played, and FIG. 5 is a schematic diagram of a network media information picture of which a feature is most similar to a feature of a pausing picture according to an embodiment of the present disclosure. Referring to FIG. 4 and FIG. 5, in the present disclosure, in a scenario where a network bandwidth condition is not good, if a stagnation event happens and causes stagnation of a video (as shown in FIG. 4), a pre-downloaded network media information picture 500 may be displayed on a playing interface when the video stagnates, and the network media information picture 500 is a network media information picture that has a highest degree of similarity with a pausing picture 400 that is already seen by a user. For example, a main hue of the pausing picture 400 is blue on blue sky and blue on bodies of characters, and a main hue of the network media information picture 500 is also blue. Therefore, relevance to content played on a video interface can be increased, the amount of attention of users on the network media information picture is increased, which further increases a click-through rate and a transformation rate of the network media information. Once the click-through rate and the transformation rate are increased, a probability of blind publishing volume expansion by a publisher is reduced, so as to further reduce waste of machine resources and network resources caused by blind publishing volume expansion by the publisher.

Figure 6:
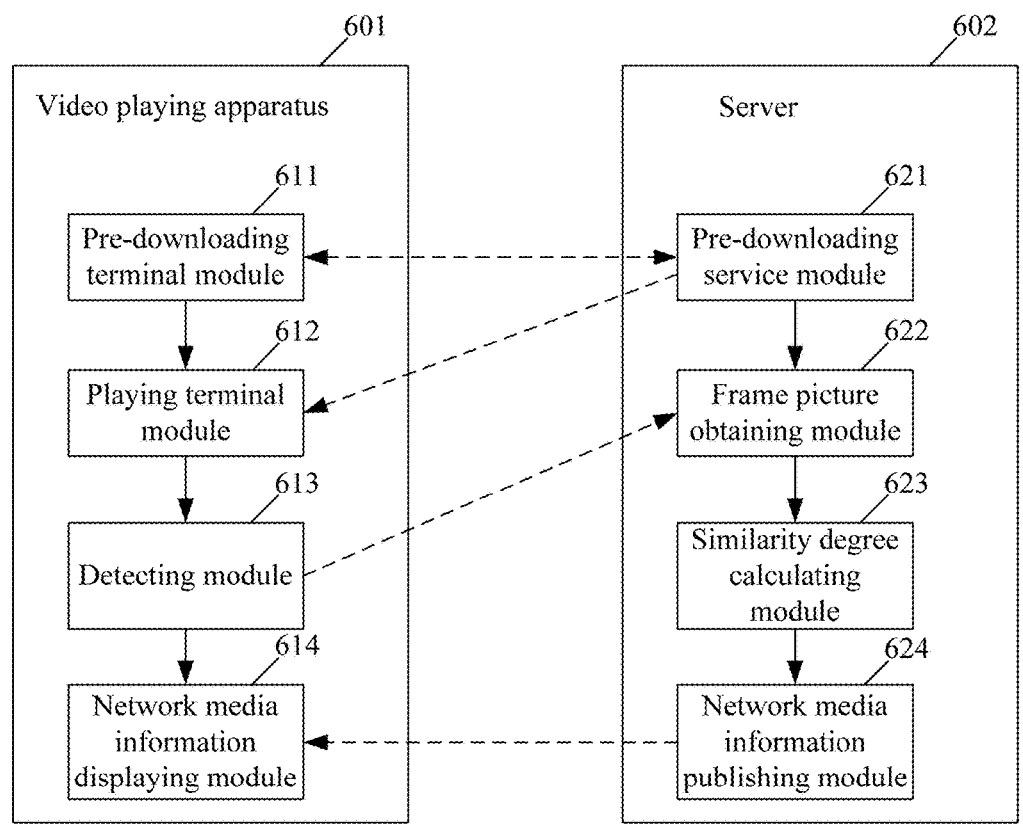
FIG. 6 is a schematic structural diagram of a system for controlling network media information publication according to an embodiment of the present disclosure.

The present disclosure further discloses a system for controlling network media information publication corresponding to the foregoing method. FIG. 6 is a schematic structural diagram of a system for controlling network media information publication according to an embodiment of the present disclosure. Referring to FIG. 6, the system for controlling publication includes a video playing apparatus 601 located at a terminal side and a server 602 located at a network side.

The video playing apparatus 601 includes:

a pre-downloading terminal module 611, configured to send a video play request to the server 602, download more than one piece of network media information returned by the server 602, and store the more than one piece of network media information locally;

a playing terminal module 612, configured to play a video returned by the server 602;

a detecting module 613, configured to perform detection for a stagnation event of the video, and send stagnation event information to the server 602 when a stagnation event occurs; and a network media information displaying module 614, configured to receive a network media information identifier returned by the server 602, read network media information locally according to the network media information identifier, and display the network media information on a current playing interface.

In a preferred embodiment, the detecting module 613 is configured to: perform detection for a loading pause event of the video and perform detection for a frame miss event of the video; add a frame picture or a frame number of a current pausing interface to the sent stagnation event information when a loading pause event of the video is detected; and add a frame number of a missed frame to the sent stagnation event information when a frame miss event of the video is detected.

In a preferred embodiment, the detecting module 613 is configured to: send a flag bit including a normal value when the video is normally played, and send a flag bit including an abnormal value when a stagnation event of the video is detected.

The server 602 includes:

a pre-downloading service module 621, configured to receive the video play request, return the more than one piece of network media information to a requester, and return data of the video of which playing is requested;

a frame picture obtaining module 622, configured to receive the stagnation event information of the requester, and read, according to the stagnation event information, the frame picture related to the stagnation event;

a similarity degree calculating module 623, configured to calculate a degree of similarity between the frame picture and each piece of network media information; and a network media information publishing module 624, configured to select the network media information having a highest degree of similarity with the frame picture, and return the identifier of the network media information to the requester.

In this embodiment, both of the playing terminal and the server include a memory and one or more processors. The memory includes storage medium, which may further include memory modules, e.g., a read-only memory (ROM), a random access memory (RAM), and flash memory modules, and mass storages, e.g., a CD-ROM, a U-disk, a removable hard disk, etc, which are all non-transitory storage mediums. The storage medium may be a non-transitory computer readable storage medium that stores program modules for implementing various processes, when executed by the processors.

Figure 7:
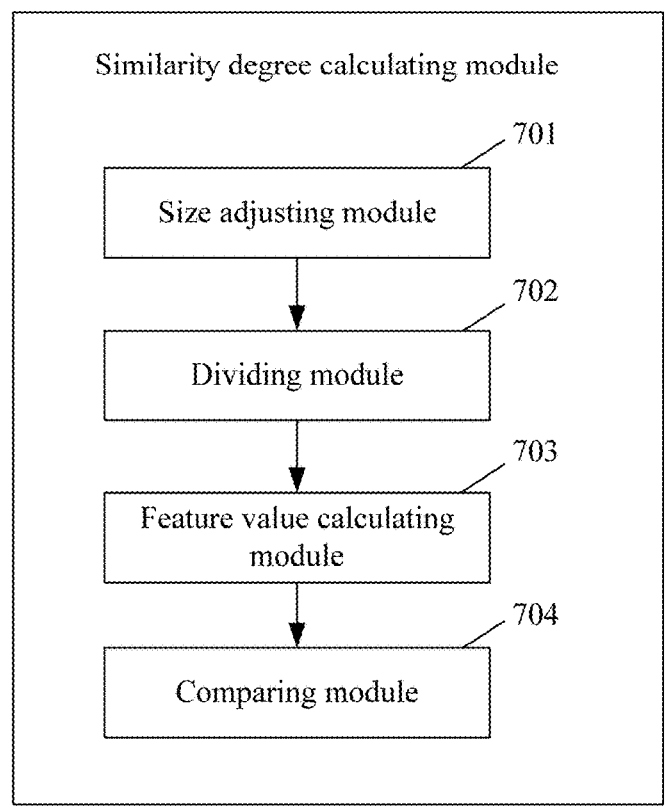
FIG. 7 is a schematic composition diagram of a similarity degree calculating module according to the present disclosure.

FIG. 7 is a schematic composition diagram of a similarity degree calculating module according to the present disclosure. Referring to FIG. 7, the similarity degree calculating module includes:

a size adjusting module 701, configured to adjust a size of the frame picture and a size of each piece of network media information to a same size; and a dividing module 702, configured to divide the frame picture and each piece of network media information into a same quantity of comparing units.

In an embodiment, the comparing unit may be an image point, namely a smallest unit of a picture. In another embodiment, the comparing unit may also be an image block, that is, the picture may be divided into several areas, where each area constitutes an image block.

A feature value calculating module 703 is configured to calculate a feature value of each comparing unit of the frame picture and a feature value of each comparing unit of each piece of network media information.

A calculating method of the feature value calculating module 703 includes: calculating the feature value of each comparing unit of the frame picture separately, and calculating the feature value of each comparing unit of each piece of network media information separately.

Following steps are performed for each comparing unit:

Firstly, at least one image element value of the comparing unit is obtained. The at least one image element value at least includes: a color value, a resolution value, a lightness value, a pixel value, and a specified material value.

Afterwards, cluster analysis is performed on the at least one image element value by adopting a cluster analysis method, and an acquired value is used as a feature value of the comparing unit.

In an embodiment, the cluster analysis method is a method combining common hashing with local sensitive hashing.

A comparing module 704 is configured to comparing the feature value of each comparing unit of the frame picture with a feature value of a comparing unit having a same position as the comparing unit of the frame picture on the network media information picture, and calculating a degree of similarity between the feature values; and adding degrees of similarity between feature values of all comparing units of the frame picture and feature values of all comparing units of the network media information picture together, so that an acquired total similarity degree is a degree of similarity between the frame picture and the network media information picture.

Besides, in another preferred embodiment, the pre-downloading service module 621 is configured to: obtain dimensional information of the video play request, where the dimensional information at least includes a program category feature of the video to be played; match the dimensional information against a directional dimension of network media information submitted by a publisher, so as to acquire matching network media information; and return the matching network media information to the requester.

In an embodiment, the frame picture obtaining module 622 is configured to: receive the stagnation event information of the requester; use, if the stagnation event information carries a frame picture of a current pausing interface, the frame picture as the frame picture related to the stagnation event; and obtain, if the stagnation event information carries a frame number, a frame picture corresponding to the frame number, and use the frame picture as the frame picture related to the stagnation event.

In another embodiment, the stagnation event information is a flag bit including a normal value or an abnormal value; and the frame picture obtaining module 622 is configured to: receive a flag bit including a normal value or an abnormal value of the requester; and skip processing if the flag bit includes the normal value; or read a latest frame picture that is sent before the flag bit is received if the flag bit contains the abnormal value, and use the frame picture as the frame picture related to the stagnation event.

The network media information processing technology described in the present disclosure can be applied to many industry fields. For example, the network media information processing technology can be applied to the field of Internet advertisement processing and displaying, and an Internet advertisement can be regarded as a type of network media information.

In addition, the functional modules in the embodiments of the present disclosure may be integrated into one processing unit, or each of the modules may exist alone physically, or two or more modules may be integrated into one unit. The integrated unit may be implemented in the form of hardware, or may be implemented in the form of a software functional unit. The functional modules in the embodiments may be located in one terminal or network node, or may be distributed on multiple terminals or network nodes.

The above descriptions are merely preferred embodiments of the present disclosure, and are not intended to limit the present disclosure. Any modification, equivalent replacement, or improvement made within the spirit and principle of the present disclosure shall fall within the protection scope of the present disclosure.

What is claimed is:

1. A method for controlling network media information publication, the method comprising:
    downloading, by a terminal comprising a memory and a processor, more than one piece of network media information;
    receiving, by the terminal, frames of a video in response to the terminal completing downloading the more than one piece of network media information;
    playing, by the terminal, the received frames of the video;
    performing, by the terminal, detection for a stagnation event of the video during playing the received frames of the video;
    reading, by the terminal, a frame picture related to the stagnation event;
    adjusting, by the terminal, a size of the frame picture related to the stagnation event and a size of each piece of network media information to a same size;
    dividing, by the terminal, the frame picture related to the stagnation event and each piece of network media information into a same quantity of comparing units;
    calculating, by the terminal, a degree of similarity between the frame picture related to the stagnation event and each of the more than one piece of network media information according to a feature value of each comparing unit of the frame picture related to the stagnation event and a feature value of each comparing unit of each piece of network media information;
    selecting, by the terminal, one of the more than one piece of network media information which has a highest degree of similarity with the frame picture related to the stagnation event; and
    displaying, by the terminal, the selected network media information on a current playing interface of the video.

2. The method according to claim 1, wherein the calculating the degree of similarity between the frame picture related to the stagnation event and each of the more than one piece of network media information comprises:
    calculating, by the terminal, for each piece of network media information, the degree of similarity between the feature value of each comparing unit of the frame picture related to the stagnation event and a feature value of a comparing unit having a same position as the comparing unit of the frame picture related to the stagnation event on the network media information; and
    adding, by the terminal, degrees of similarity between feature values of all comparing units of the frame picture related to the stagnation event and feature values of all comparing units of the network media information together, so that an acquired total similarity degree is the degree of similarity between the frame picture related to the stagnation event and the network media information.

3. The method according to claim 1, further comprising:
calculating, by the terminal, the feature value of each comparing unit of the frame picture related to the stagnation event and the feature value of each comparing unit of each piece of network media information.

4. The method according to claim 3, wherein the calculating the feature value of each comparing unit of the frame picture related to the stagnation event and the feature value of each comparing unit of each piece of network media information comprises:
performing following steps for each comparing unit:
obtaining, by the terminal, at least one image element value of the comparing unit; and
performing, by the terminal, cluster analysis on the at least one image element value by adopting a cluster analysis method, and using a value acquired through cluster analysis as a feature value of the comparing unit.

5. The method according to claim 4, wherein the at least one image element value comprises: a color value, a resolution value, a lightness value, a pixel value, and a specified material value.

6. The method according to claim 4, wherein the cluster analysis method includes combining common hashing with local sensitive hashing.

7. The method according to claim 1, wherein the comparing unit is an image point or an image block.

8. The method according to claim 1, wherein the downloading the more than one piece of network media information comprises:
obtaining, by the terminal, dimensional information of a video play request, wherein the dimensional information comprises a program category feature of the video to be played;
matching, by the terminal, the dimensional information against a directional dimension of network media information submitted by a publisher, so as to acquire matching network media information; and
downloading, by the terminal, the matching network media information.

9. The method according to claim 1, wherein:
the performing detection for the stagnation event of the video comprises:
performing, by the terminal, detection for a loading pause event of the video; and the reading the frame picture related to the stagnation event comprises:
reading, by the terminal, the frame picture of a current pausing interface of the video when the loading pause event of the video is detected.

10. The method according to claim 1, wherein:
the performing detection for the stagnation event of the video comprises:
performing, by the terminal, detection for a frame miss event; and
the reading the frame picture related to the stagnation event comprises:
reading, by the terminal, when the frame miss event of the video is detected, the last frame picture that is already played.

11. A video playing apparatus, comprising:
one or more processors; and
memory storing program instructions that, when executed by the one or more processors, configure the apparatus to:
download more than one piece of network media information;
receiving frames of a video in response to completing downloading the more than one piece of network media information;
play the received frames of the video;
perform detection for a stagnation event of the video during playing the received frames of the video;
send stagnation event information to a server in response to the stagnation event being detected, to facilitate the server to read a frame picture related to the stagnation event, adjust a size of the frame picture related to the stagnation event and a size of each piece of network media information to a same size, divide the frame picture related to the stagnation event and each piece of network media information into a same quantity of comparing units, calculate a degree of similarity between the frame picture related to the stagnation event and each of the more than one piece of network media information according to a feature value of each comparing unit of the frame picture related to the stagnation event and a feature value of each comparing unit of each piece of network media information, and select one of the more than one piece of network media information which has a highest degree of similarity with the frame picture related to the stagnation event; and
display the selected network media information on a current playing interface of the video.

12. The apparatus according to claim 11, wherein perform detection for a stagnation event of the video comprises:
perform detection for a loading pause event of the video and perform detection for a frame miss event of the video.

13. The apparatus according to claim 12, wherein, when the program instructions is executed by the one or more processors, the apparatus is further configured to:
add a frame picture or a frame number of a current pausing interface to the sent stagnation event information when a loading pause event of the video is detected; and
add a frame number of a missed frame to the sent stagnation event information when a frame miss event of the video is detected.

14. The apparatus according to claim 11, wherein, when the program instructions is executed by the one or more processors, the apparatus is configured to:
send a flag bit comprising a normal value when the video is normally played; and
send a flag bit comprising an abnormal value when a stagnation event of the video is detected.

15. A server, comprising:
one or more processors; and
memory storing program instructions that, when executed by the one or more processors, configure the server to:
receive a video play request;
return more than one piece of network media information matching the video play request to a requester;
return frames of a video of which playing is requested, in response to completing returning the more than one piece of network media information;
receive stagnation event information of the requester, which is detected by the requester during playing the frames of the video;
read, according to the stagnation event information, a frame picture related to a stagnation event;
adjust a size of the frame picture related to the stagnation event and a size of each piece of network media information to a same size;

divide the frame picture related to the stagnation event and each piece of network media information into a same quantity of comparing units;

calculate a degree of similarity between the frame picture related to the stagnation event and each of the more than one piece of network media information according to a feature value of each comparing unit of the frame picture related to the stagnation event and the feature value of each comparing unit of each piece of network media information; and select one of the more than one piece of network media information which has a highest degree of similarity with the frame picture related to the stagnation event, so that the requester displays the selected network media information on a current playing interface of the video.

16. The server according to claim 15, wherein when the program instructions is executed by the one or more processors, the server is further configured to:

calculate the feature value of each comparing unit of the frame picture related to the stagnation event and the feature value of each comparing unit of each piece of network media information.

17. The server according to claim 15, wherein when the program instructions configure the server to calculate the degree of similarity between the frame picture related to the stagnation event and each of the more than one piece of network media information, the server is configured to:

calculate, for each piece of network media information, the degree of similarity between the feature value of each comparing unit of the frame picture related to the stagnation event and a feature value of a comparing unit having a same position as the comparing unit of the frame picture related to the stagnation event on the network media information; and add degrees of similarity between feature values of all comparing units of the frame picture related to the stagnation event and feature values of all comparing units of the network media information together, so that an acquired total similarity degree is a degree of similarity between the frame picture related to the stagnation event and the network media information.

18. The server according to claim 15, wherein when the program instructions is executed by the one or more processors, the server is further configured to:

obtain dimensional information of the video play request, wherein the dimensional information comprises a program category feature of the video to be played;

match the dimensional information against a directional dimension of network media information submitted by a publisher, so as to acquire matching network media information; and return the matching network media information to the requester.

19. The server according to claim 15, wherein when the program instructions is executed by the one or more processors, the server is further configured to:

receive the stagnation event information of the requester;

use, in instances when the stagnation event information carries a frame picture of a current pausing interface, the frame picture of the current pausing interface as the frame picture related to the stagnation event; and obtain, in instances when the stagnation event information carries a frame number, a frame picture corresponding to the frame number, and use the frame picture corresponding to the frame number as the frame picture related to the stagnation event.

20. The server according to claim 15, wherein the stagnation event information is a flag bit comprising a normal value or an abnormal value, and when the program instructions is executed by the one or more processors, the server is further configured to:

receive a flag bit comprising a normal value or an abnormal value of the requester; and read, when the flag bit comprises an abnormal value, a latest frame picture that is sent before the flag bit is received, and use the latest frame picture as the frame picture related to the stagnation event.

* * * * *